United States Patent [19]

Kawaoka

[11] Patent Number: 5,488,405
[45] Date of Patent: Jan. 30, 1996

[54] VIDEO PRINTER HAVING A FRAME MEMORY CONFIGURED TO EFFECTIVELY UTILIZE A DOUBLE-DENSITY PRINTING HEAD WHEN PRINTING REDUCED-SIZE IMAGES

[75] Inventor: Yoshiki Kawaoka, Tokyo, Japan

[73] Assignee: Fuji Photo Film Co., Ltd., Kanagawa, Japan

[21] Appl. No.: 83,254

[22] Filed: Jun. 29, 1993

[30] Foreign Application Priority Data

Jun. 29, 1992 [JP] Japan .................................... 4-170384

[51] Int. Cl.$^6$ ................................................ H04N 1/21
[52] U.S. Cl. ........................................... 347/251; 347/254
[58] Field of Search ......................... 346/160, 108, 346/107 R, 76 L, 1.1; 358/296, 300, 302, 298, 457; 347/251, 254, 240, 131, 183

[56] References Cited

U.S. PATENT DOCUMENTS

| | | | |
|---|---|---|---|
| 4,872,064 | 10/1989 | Tutt et al. ............................ | 358/464 |
| 4,965,662 | 10/1990 | Shiota ................................. | 358/462 |
| 5,317,417 | 5/1994 | Yamamura ........................... | 358/457 |

*Primary Examiner*—Mark J. Reinhart
*Attorney, Agent, or Firm*—Sughrue, Mion, Zinn, Macpeak & Seas; Richard C. Turner

[57] ABSTRACT

The invention has for its object to provide a video printer which enables multi-prints of improved image quality to be obtained, and which is built up of a frame memory 18 having a capacity of 1,024 pixels (H)×512 pixels (V), a thermal head 28 of 1,024 elements, and a control unit 40 designed to repeat a printing process by the number of print lines, wherein, upon multi-printing indicated, the first four images $A_1$, $B_1$, $C_1$ and $D_1$ are reduced to ½ in size for writing in a frame memory 18, then the image data in Y from 0 to 511 are written at X=0 in the 0 to 511 addresses on a line memory 22, then the image data in Y from 0 to 511 are written at X=512 in the 512 to 1,023 addresses on the line memory 22, and finally the thus written 1,024 image data are transferred every print line to the thermal head 28 via a gradation control unit 24, whereby the four images are printed on a recording paper. By repeating the above process four times, 16 images are printed on the single recording paper.

2 Claims, 7 Drawing Sheets

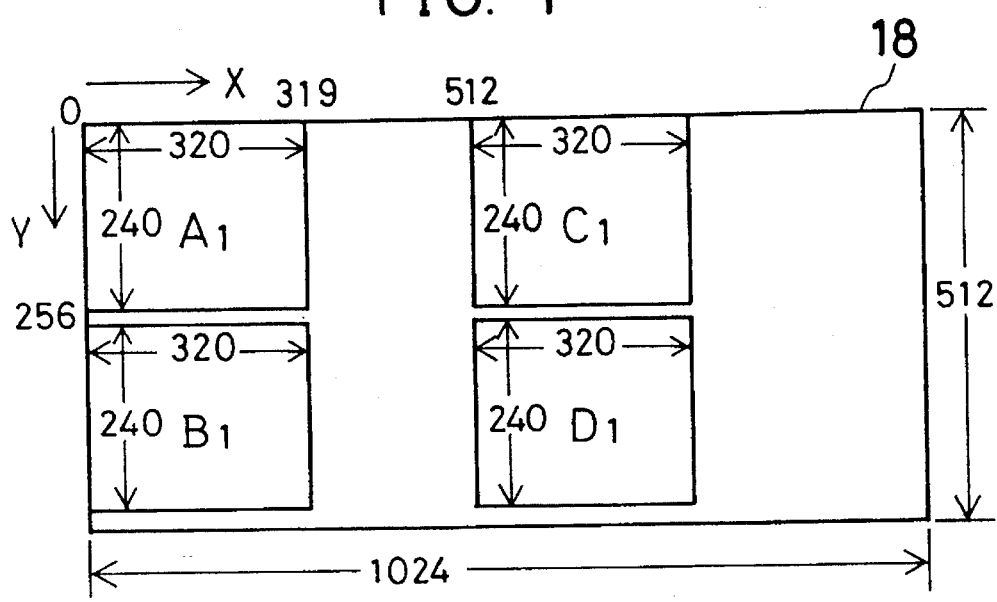
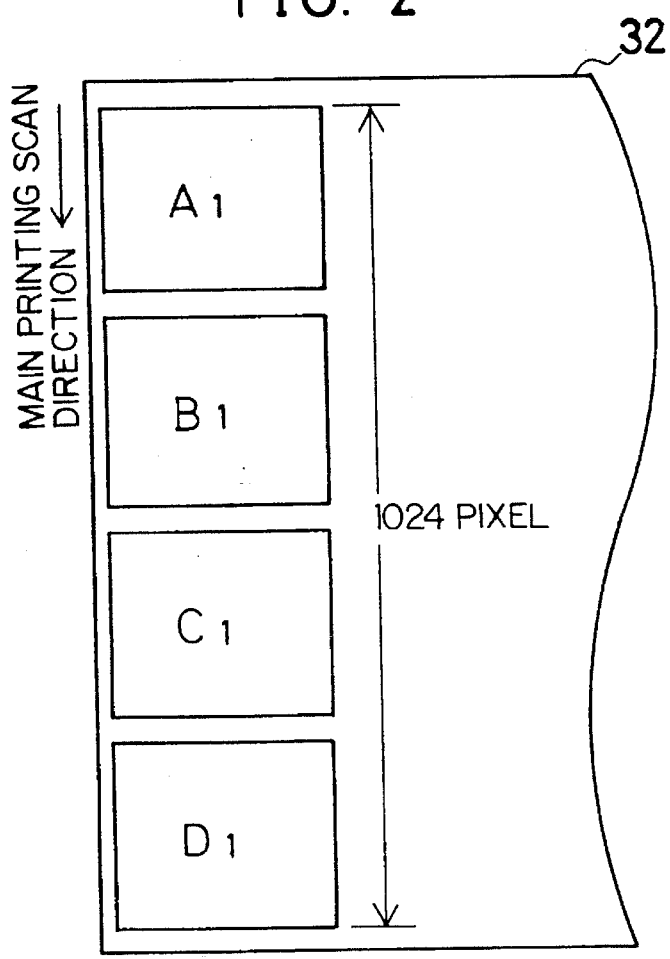

VIDEO PRINTER HAVING A FRAME MEMORY CONFIGURED TO EFFECTIVELY UTILIZE A DOUBLE-DENSITY PRINTING HEAD WHEN PRINTING REDUCED-SIZE IMAGES

BACKGROUND OF THE INVENTION

The present invention relates generally to a video printer, and is more specifically directed to the construction of a frame memory and how to use it.

Image recording apparatus so far known to make variable-contrast and multicolor prints of NTSC or other standard formats of TV images include a color video printer, one typical construction of which is illustrated in FIG. 6.

FIG. 6 is a block diagram showing one typical construction of a heat-sensitive sublimation type of color video printer designed to receive an NTSC signal that is a composite image signal, and three primary color signals R, G and B. The NTSC signal is converted in a decoder 14 to three primary color signals R, G and B, which are in turn converted in an A/D converter 16 to digital image data having given gradations, e.g., 256 gradations, for storage in a frame memory 18. Signals R, G and B sent out of an external image signal device such as a monitor are also entered directly into the A/D converter 16, wherein they are converted to digital image signals for storage in the frame memory 18.

The image data stored in the frame memory 18 are read out, one line at a time, under the control of a control unit 40 for writing into a line memory 22. The image data read out of the line memory 22 are converted in a gradation control unit 24 to yellow Y, magenta M and cyan C, the three primary colors for printing, on the basis of the data read out of a gradation control look-up table 26 (hereinafter LUT for short). At this time, the gradation control unit 24 reads the data for gradation correction out of LUT 26 in accordance with a control signal sent out of a control unit 40 in response to a gradation correction command given by an operator from an input unit 36, so that the R, G and B image data or the Y, M and C image data after conversion can be corrected for gradation, using that data. The image data outputted from the gradation control unit 24 is fed to a thermal head 28 for color image printing.

A printing mechanism unit includes a recording paper 32 for recording an image thereon, as shown in FIG. 7. As illustrated, an ink sheet 30 for transferring ink onto the recording paper 32 is in contact with a platen drum 50, and the thermal head 28 is positioned over the ink sheet 30. The recording paper 32 and ink sheet 30 are driven by a printer driving unit 34 of FIG. 6 in the respective directions shown by arrows. As shogun in FIG. 8, the ink sheet 30 is made up of a base 30a such as a polyester film and a sublimable type of ink 30b deposited onto it. With a selected signal electrode of the thermal head 28 energized and heated, the ink 30b deposited onto the base 30a is transferred onto the recording paper 32. As can be seen from FIGS. 7 and 9, the ink sheet 30 is sequentially formed with regions Y, M and C deposited with three inks Y, M and C. One process of recording a color image is finished by making one image print of region Y, then making one image print of regions M, and finally making one image print of region C. The ink sheet 30, if put in a cassette, for instance, is easy to handle.

Referring to FIG. 6, the R, G and B image data written in the frame memory 18 are read from it under the control of the control unit 40, then converted in a D/A converter 42 to analog signals, and finally converted in an encoder 44 to NTSC signals, which are fed to a CRT 46, whereby the image that is being printed is displayed on the CRT 46.

Referring now to the number of pixels when an NTSC format of image is to be printed, satisfactory results are obtained, if about 640 pixels exist in the horizontal direction (i.e., in a row) and about 480 pixels in the vertical direction (i.e., in a column). Therefore, a 512-pixel thermal head may be used as the thermal head 28 in the conventional video printer, and a memory of, e.g., 1,024 pixels (horizontal)×512 pixels (vertical) may be used as the frame memory 18. When one image is printed on one recording paper, the control unit 40 writes the image data of that image in the frame memory 18, as illustrated in FIG. 10. After this, the image data of X=0 are transferred to a line memory 22 by 512 pixels, i.e., Y=0 to Y=511. Upon the image data written in the line memory 22 transferred to the thermal head 28, read addresses in the X direction are incremented up to transfer the image data of X=1 to the line memory 22 by 512 pixels, i.e., Y=0 to Y=511. The above operation is repeated until X=639, whereby the image mentioned above is printed. As can be clearly appreciated from what has been described, the main printing scan direction is set in the vertical scan direction of a TV image. This shall hereinafter apply.

A video printer is now required not only to be capable of printing one image on one recording paper, but also to have multi-printing functionality that enables a plurality of images to be printed on one recording paper. When multi-printing is done with a conventional video printer, the resultant images are of considerably inferior quality. This is because the image data of the images to be printed are first subjected to pixel-thinning or other suitable processing to reduce them, then all the image data to be printed are written in the frame memory 18, and they are finally transferred to the line memory 22 for printing. For instance, when 16 images are printed on one recording paper, each image is reduced in size to ¼ in the horizontal and vertical directions for writing in the frame memory 18, as illustrated in FIG. 11, thus making the resultant image very difficult to view.

In recent years, the thermal head 28 is increasingly required to have high density and, with this, a thermal head having 1,024 elements twice as many as conventional is developed, which will hereinafter be called the double-density head. It may be possible to make a print of higher image quality with the use of such a double-density head. It is now noted, however, that the use of the double-density head does not always result in a print of improved image quality, because the structure of the frame memory used and in what form it is used are much the same as conventional.

SUMMARY OF THE INVENTION

The problems mentioned above are solved by the present invention, the object of which is to provide a video printer that, when used for multi-printing, enables the quality of each image to be much more improved than would be possible with a conventional video printer.

According to the invention, the object mentioned above is achieved by the provision of a video printer including a frame memory having a storage capacity that is approximately as many as the number of effective scan lines of a standard format of television image in the vertical direction and is approximately twice as many as the number of pixels of a standard format of television image in the horizontal direction, a printing head with the number of printing elements being approximately twice as many as the number of pixels of said frame memory in the vertical direction, and a control means, characterized in that said controller means, when multi-printing is indicated, is operable to reduce the image data of the four images to be printed to $\frac{1}{2}^n$ in size, where n represents a natural number, in the vertical and horizontal directions for writing said image data in given positions on said frame memory, and, when printing is done, is operable to read said image data out of said frame memory for supplying said image data to said printing head, whereby said four images are printed in a row.

According to another aspect of the invention, there is provided a video printer as recited in the first aspect, characterized in that while the image data of the next four images to be printed following the printing of said first four images are written in said frame memory, the relative movement between a recording paper and said printing head is inhibited with the printing operation remaining stopped.

For the video printer of the invention, the double-density head is used. The frame memory used has a storage capacity that is approximately as many as the number of effective scan lines of a standard format of TV image in the vertical direction, and is approximately twice as many as the number of pixels of a standard format of TV image in the horizontal direction. When multi-printing for, e.g., printing 16 images on a single recording paper, is indicated, the image data of the four images to be printed are reduced in size to $\frac{1}{2}$ in the vertical and horizontal directions for writing in given positions on the frame memory, and the image data are then read out of the frame memory for feeding to the printing head in such a manner that these four images are printed in a row. This process is repeated four times.

It is then desired that, as described earlier, while the image data of the next four images to be printed following the printing of the first four images are written in the frame memory, the relative movement between the recording paper and the printing head is inhibited with the printing operation remaining stopped.

According to the invention, therefore, the print size of each image, even when multi-printed, is of higher quality and looks better than would be possible with a conventional video printer. Moreover, a cost rise, if any, can be minimized, because the frame memory used is similar in capacity to a conventional one.

BRIEF DESCRIPTION OF THE DRAWINGS

FIG. 1 is an illustration of how to write image data in the frame memory during multi-printing, FIG. 2 is an illustration showing one arrangement of the images to be printed by the first printing during multi-printing.

DESCRIPTION OF THE PREFERRED EMBODIMENTS

The present invention will now be explained, more illustratively but not exclusively, with reference to one preferable embodiment. It is noted that while the invention will be described mainly with reference to making prints of monochrome TV images for a ready understanding of the invention, the invention is equally applicable to making prints of color TV images.

Figure 12:
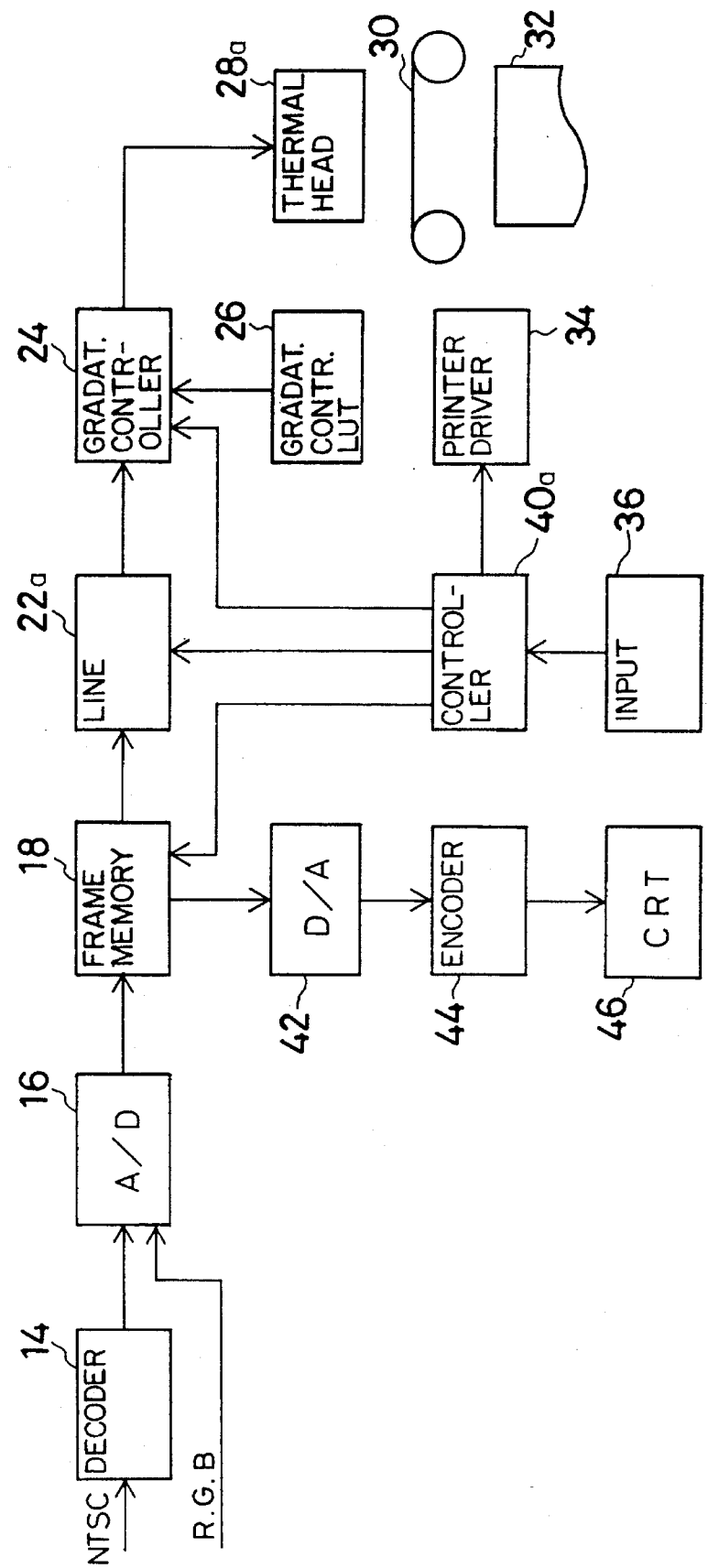
FIG. 12 is a representation of the structure of the color video printer of the present invention.

A typical general architecture of one embodiment of the video printer according to the invention is represented in FIG. 12. A frame memory 18 has a capacity of 1,024 pixels (horizontal)×512 pixels (vertical), as heretofore, but a thermal head 28a is a double-density one; that is, its number of pixels is 1,024. A line memory 22a used with this can store data corresponding to 1,024 pixels, correspondingly.

The operation of a control unit 40a will now be explained. The control unit 40a operates on two modes, one for printing one image on one recording paper (this will hereinafter be called the ordinary printing mode), and the other called the multi-printing mode for making multi-prints. In connection with the multi-printing mode, it is noted that 16 images are printed on one recording paper.

Figure 10:
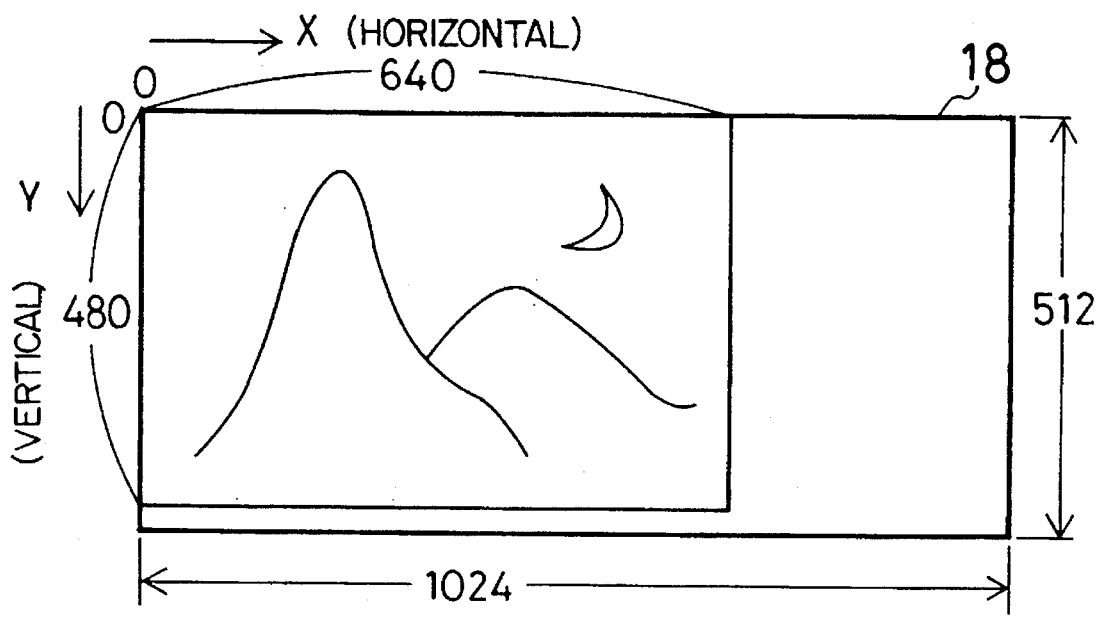
FIG. 10 is a representation of one structure of the frame memory.
Figure 11:
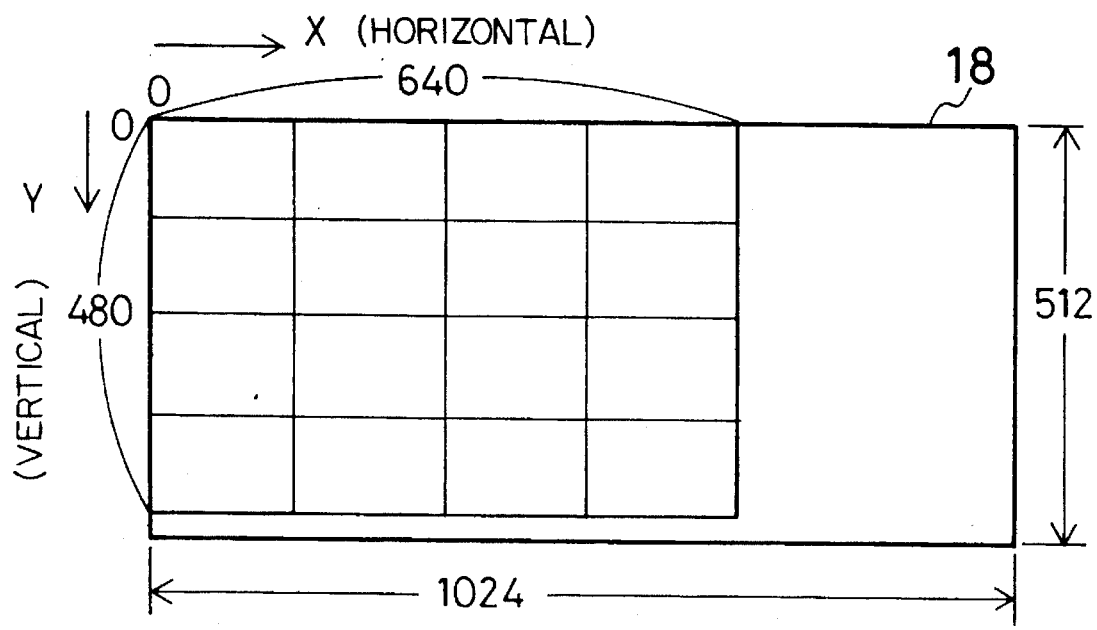
FIG. 11 illustrates the problems associated with the prior art.

Now assume that the ordinary printing mode is selected by an input unit 36 and the image to be printed is indicated; then, the control unit 40a writes the image data in the frame memory 18 in the size of 640×480, as in the prior art and as can be seen from FIG. 10. Subsequently, the control unit 40a transfers data corresponding to one line from the frame memory 18 to the line memory 22a. In this case, however, the sizes of the image in the Y and X directions are enlarged twice. In other words, at X=0, the control unit 40a accepts the image data written in the regions in Y from 0 to 511, and then allows each image data to be subjected to pixel repetition or other suitable interpolation processing to write it in the line memory 22a with the number of pixels on one print line set to 1,024. After the printing of that line has been finished, again at X=0, each image data written in the regions in Y from 0 to 511 is interpolated to write it in the line memory 22 with the number of pixels on one line set to 1,024 for printing. This process is repeated until X=639, thereby making it possible to obtain a high-quality printed image of 1,280 pixels (horizontal)×1,024 pixels (vertical) in size.

Next, when the multi-printing mode is selected by the input unit 36 and the images to be printed are indicated, the image data of the first four images are sequentially thinned or otherwise suitably processed in the control unit 40a to reduce their sizes in the horizontal and vertical directions to $\frac{1}{2}^n$ where n represents a natural number, whereupon they are written in the frame memory 18, as depicted in FIG. 1. In this case, the value of n is 1, although determined depending on image size, the capacity of the frame memory 18, and so on. More exactly, the control unit 40a writes the image data of the first image $A_1$ in the region with the vertices of the opposite angles defined by two points (0, 0) and (319, 239) on the frame memory 18, the image data of the second image $B_1$ in the region with the vertices of the opposite angles defined by two points (0, 256) and (319, 495), the image data of the third image C₁ in the region with the vertices of the opposite angles defined by two points (512, 0) and (831, 239), and the image data of the fourth image D₁ in the region with the vertices of the opposite angles defined by two points (512, 256) and (831, 495). As will be obvious to those skilled in the art, such write address control may be achieved by various methods. It is understood that data having a given density, e.g., pure white data are written between the respective image data of the four images $A_1$, $B_1$, $C_1$ and $D_1$, thereby making it possible for the resultant multi-print to look well.

After the writing of the image data of the four images in the frame memory 18 has been finished, the control unit 40a starts transferring the image data from the frame memory 18 to the line memory 22a; that is, at X=0, the control unit 40a first accepts the image data written in the regions in Y from 0 to 511, and writes them in the 0 to 511 addresses on the line memory 22a, and then, at X=512, accepts the image data written in the regions in Y from 0 to 511 and writes them in the 512 to 1023 addresses on the line memory 22a. The 1024 image date thus written in the line memory 22a are transferred via a gradation control unit 24 to the thermal head 28a for the printing of the first line, as in the prior art.

As the gradation control of the first printing line has been finished with the line memory 22a put in an enabling state, the control unit 40a accepts at X=1 the image data written in the regions in Y from 0 to 511 to write them in the 0 to 511 addresses on the line memory 22a. Then, at X=513, the control unit 40a accepts the image data written in the regions in Y from 0 to 511 to write them in the 512 to 1023 addresses on the line memory 22a. The 1024 image data thus written in the line memory 22a are transferred via the gradation control unit 24 to the thermal head 28a for the printing of the second line.

Figure 3:
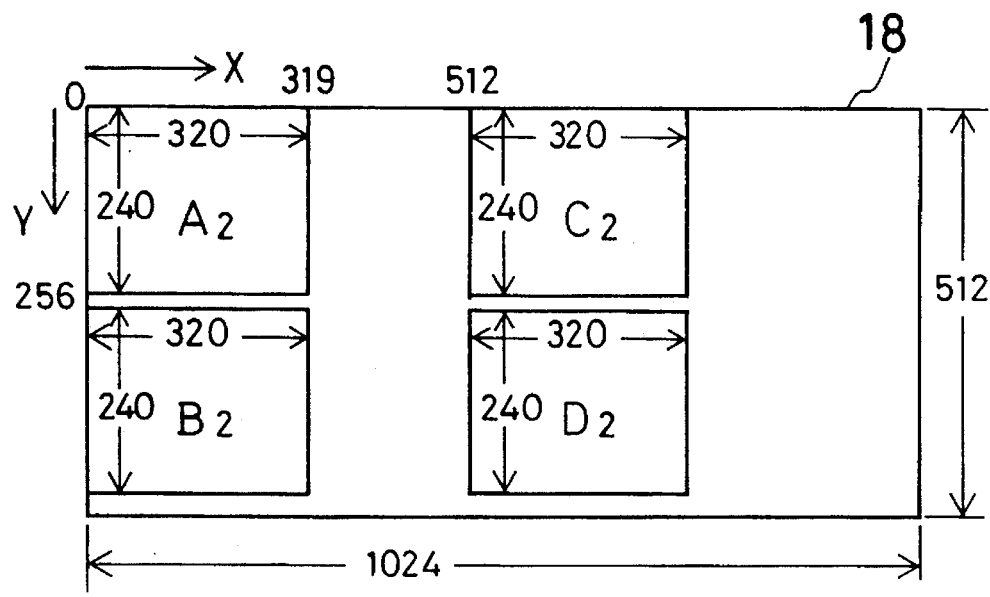
FIG. 3 is an illustration of how to write image data in the frame memory during multi-printing.
Figure 4:
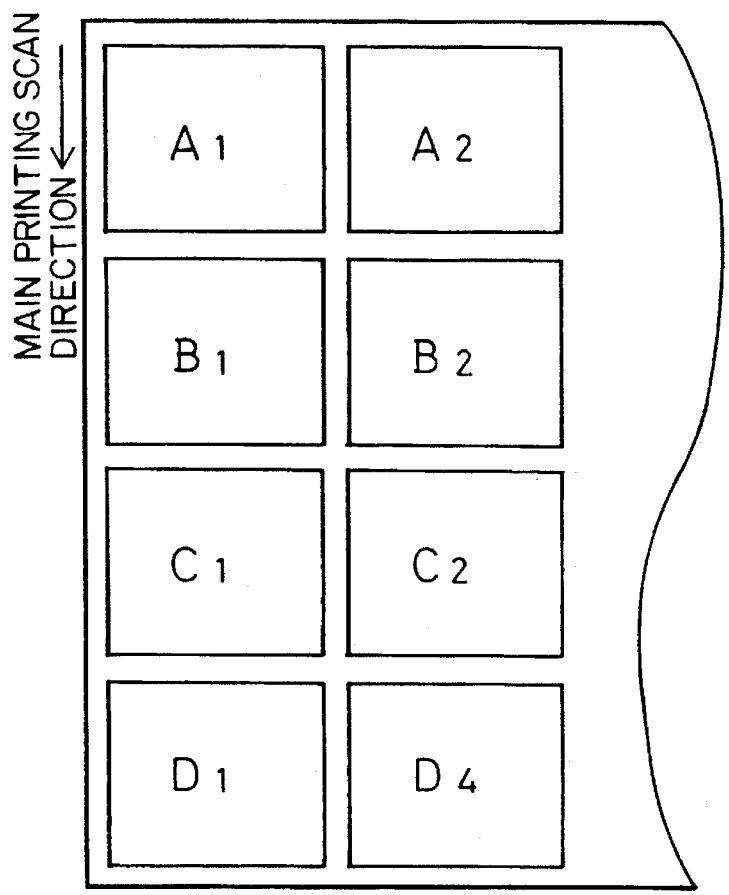
FIG. 4 is an illustration showing one arrangement of the images to be printed by the second printing during multi-printing.

This process in the control unit 40a is repeated by a given number of print lines. As a matter of course, the number of print lines is set to a suitable value between 320 and 511 inclusive. This enables such an image as depicted in FIG. 2 to be printed on the recording paper. Following the completion of the printing of the first four images, the control unit 40a issues instructions to a printer driving unit 34, thereby stopping the delivery of the recording paper and the printing operation. This causes the delivery of the recording paper to be stopped, so that, as illustrated in FIG. 2, the thermal head 28a is kept at the position where the printing of the four images has been finished. At this time, the control unit 40a subjects the indicated next four image data sequentially to pixel thinning or other suitable processing, thereby reducing their sizes in the horizontal and vertical directions to ½ for writing in the frame memory 18, as illustrated in FIG. 3. Following the completion of the writing of the four image data, the control unit 40a then gives an instruction to the printer driving unit 34 to resume the printing operation, whereby the process mentioned above is repeated to bring the printing of eight images to an end, as shown in FIG. 4.

Figure 5:
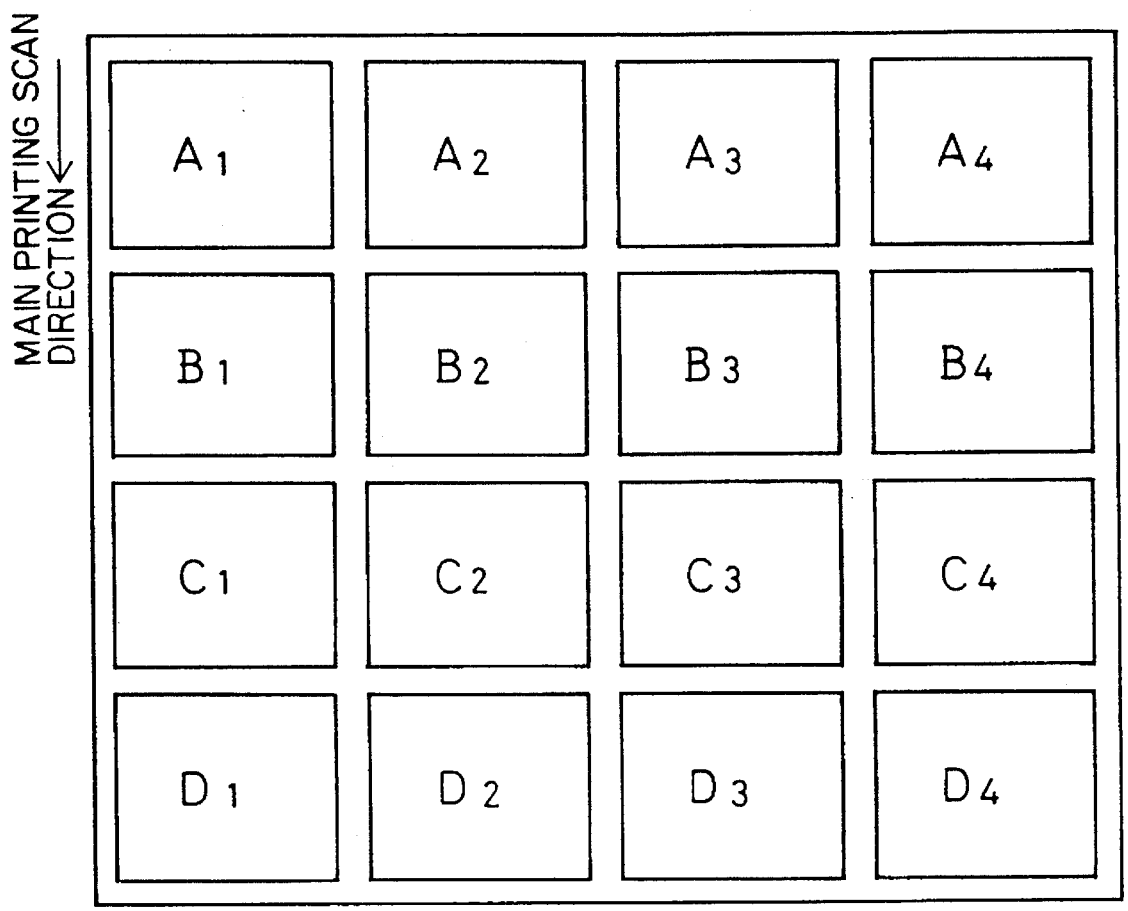
FIG. 5 is a representation showing one arrangement of the images that are finally obtained by multi-printing.
Figure 6:
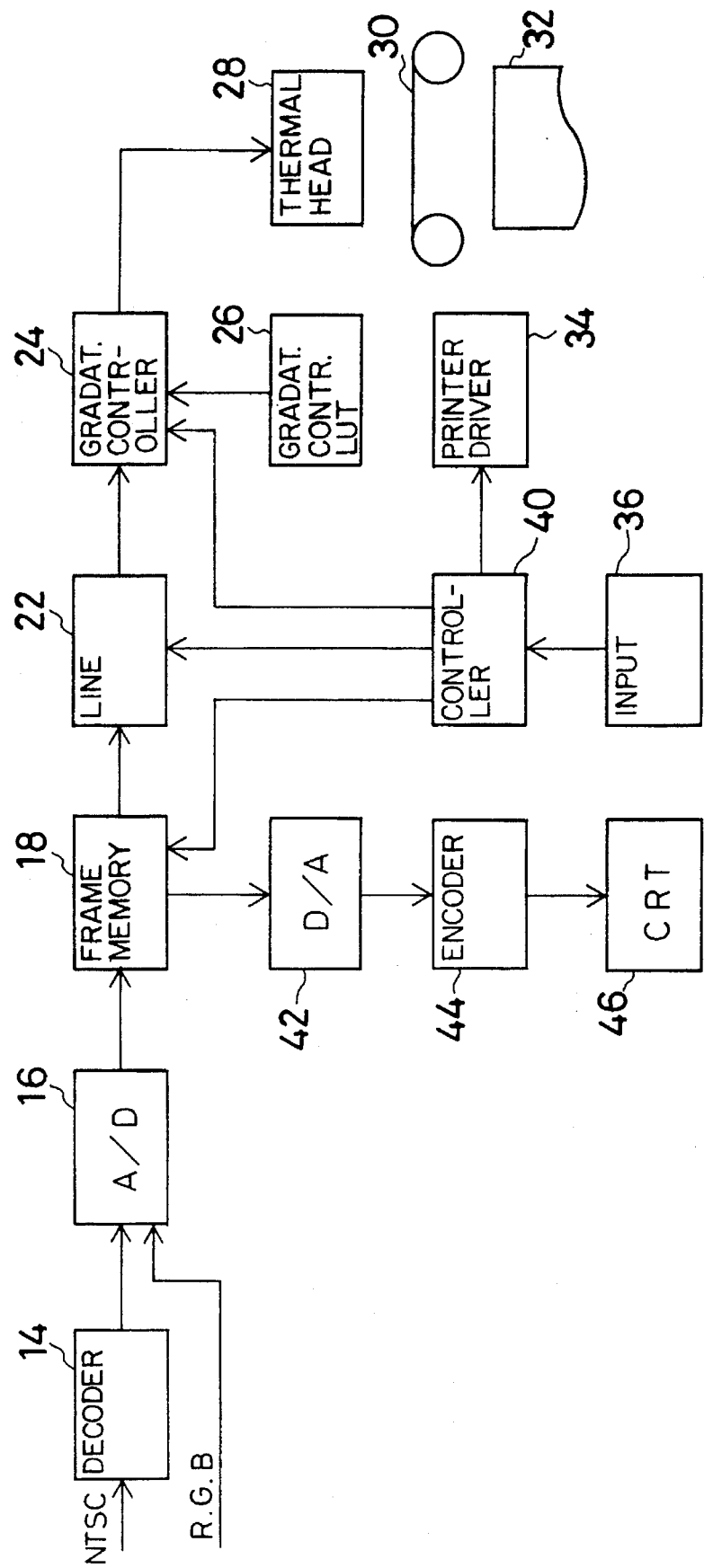
FIG. 6 is a representation of one typical structure of the color video printer.
Figure 7:
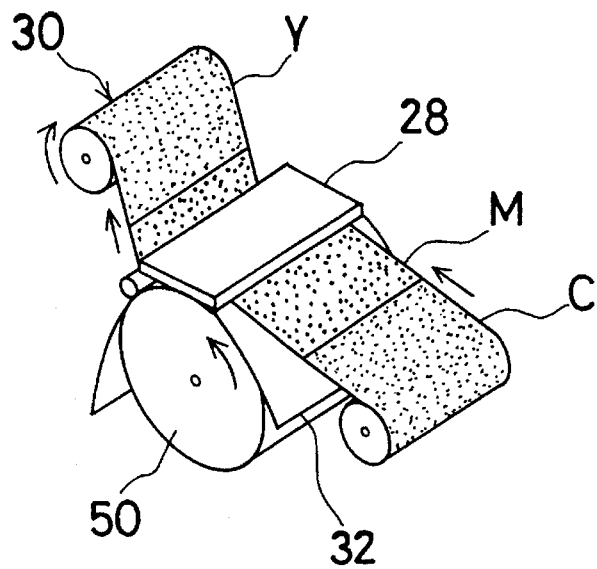
FIG. 7 is a representation of one typical structure of the printing mechanism unit.
Figure 8:
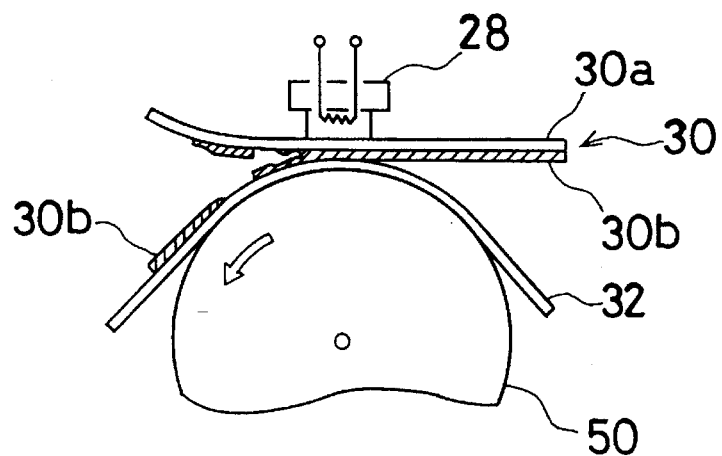
FIG. 8 is a representation of how printing is achieved with the use of an ink sheet.
Figure 9:
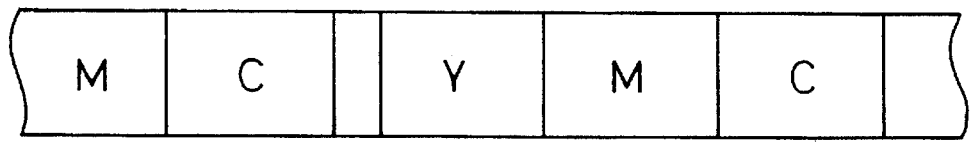
FIG. 9 is a representation of one ink array on the ink sheet.

By repeating the process mentioned above, such multi-printing as shown in FIG. 5 can be finished.

While the invention has been described with reference to one embodiment, it is understood that the invention is by no means limited thereto, and may be variously modified. For instance, while the above embodiment has been described with reference to using a heat-sensitive sublimation type of video printer, it is understood that the invention is equally applicable to other types of video printers. Four image data, when written in the frame memory, may be written therein without leaving any space.

What we claim is:

1. A video printer for printing a plurality of reduced images on one recording paper, the reduced images being arranged on the one recording paper in columns, the reduced images corresponding, respectively, to a plurality of received images, each of the received images having, in a vertical direction, a number of effective scan lines, and having, in a horizontal direction, a number of pixels, said video printer comprising:

a frame memory which stores columns and rows of pixels, said frame memory having a capacity to store in a column a number of pixels that is approximately equal to the number of effective scan lines, and having a capacity to store in a row a number of pixels that is approximately twice the number of pixels of each of the received images in the horizontal direction;

a printing head comprising a number of printing elements that is approximately twice the number of pixels stored in a column of said frame memory, said printing elements being disposed to print vertical lines of pixels; and controller means which reduces image data of said received images and which writes into the frame memory the reduced image data of the reduced images which form one of said columns of images, such that the reduced image data which is used to print one of said vertical lines of pixels is stored in two columns of the frame memory, said controller supplying the reduced image data stored in the frame memory to said printing head in order to prim one of the columns of images.

2. The video printer according to claim 1, wherein:

said controller writes into said frame memory the reduced image data of the reduced images which form another of said columns of images; and while said controller writes the reduced image data of the reduced images into said frame memory, a position of the one recording paper relative to said printing head does not change.

* * * * *